United States Patent
Underwood, III (10) Patent No.: US 12,261,405 B2
(45) Date of Patent: Mar. 25, 2025

(54) APPARATUS AND METHOD FOR SPECTRALLY SHAPING A LASER BEAM

(71) Applicant: Nufern, East Granby, CT (US)

(72) Inventor: Mitchell Underwood, III, Hamden, CT (US)

(73) Assignee: Nufern, East Granby, CT (US)

( * ) Notice: Subject to any disclaimer, the term of this patent is extended or adjusted under 35 U.S.C. 154(b) by 801 days.

(21) Appl. No.: 17/364,315

(22) Filed: Jun. 30, 2021

(65) Prior Publication Data

US 2023/0006407 A1    Jan. 5, 2023

(51) Int. Cl.
   *H01S 3/10*     (2006.01)
   *G02B 5/30*     (2006.01)
   *H01S 3/00*     (2006.01)

(52) U.S. Cl.
   CPC .......... *H01S 3/0057* (2013.01); *G02B 5/3025* (2013.01); *G02B 5/3083* (2013.01); *H01S 3/0085* (2013.01); *H01S 3/10015* (2013.01); *H01S 3/10053* (2013.01); *H01S 3/10061* (2013.01)

(58) Field of Classification Search
   CPC . H01S 3/0085; H01S 3/10053; H01S 3/10061
   See application file for complete search history.

(56) References Cited

U.S. PATENT DOCUMENTS

| | | | |
|---|---|---|---|
| 5,889,900 A | 3/1999 | Hallemeier | |
| 2001/0010593 A1 | 8/2001 | Terahara et al. | |
| 2002/0080467 A1 | 6/2002 | Damask | |
| 2013/0063808 A1 | 3/2013 | Rothenberg | |
| 2019/0288481 A1 | 9/2019 | Sacks et al. | |
| 2020/0335928 A1 | 10/2020 | Underwood | |
| 2021/0021095 A1 | 1/2021 | Di Teodoro et al. | |

FOREIGN PATENT DOCUMENTS

CN     107069402 A     8/2017

OTHER PUBLICATIONS

Anderson et al., (2017). "SBS suppression and coherence properties of a flat top optical spectrum in a high power fiber amplifier," Proceedings of SPIE, 10083, 9 pages.
(Continued)

*Primary Examiner* — Paisley L Wilson
(74) *Attorney, Agent, or Firm* — Morrison & Foerster LLP (57) ABSTRACT

An optical apparatus for spectrally shaping a laser beam within a fiber MOPA laser is disclosed. The apparatus includes a birefringent optic and a linear polarizer. The laser beam is divided between two orthogonal polarization axes of the birefringent optic having polarization mode dispersion. Propagation of the laser beam through the birefringent optic causes a wavelength-dependent phase shift between components of the laser beam in the two polarization axes. A polarizing direction of the polarizer is oriented between the two polarization axes. Propagation of the polarization-dispersed laser beam through the polarizer modulates the power spectral density of a transmitted portion of the laser beam. This spectral modulation can be tuned to shape a Gaussian spectral distribution from the master oscillator into a uniform spectral distribution for amplification by the power amplifier. The uniform spectrally-shaped laser beam can be amplified to higher powers than the original Gaussian laser beam.

19 Claims, 7 Drawing Sheets

(56) References Cited

OTHER PUBLICATIONS

Bohm et al., (1983). "Performance of Lyot Depolarizers with Birefringent Single-Mode Fibers," Journal of Lightwave Technology, 1:71-74.
Burns et al., (1983). "Degree of Polarization in the Lyot Depolarizer," Journal of Lightwave Technology, 1:475-479.
Kang et al., (2006). "Suppression of the polarization dependence of fiber Bragg grating interrogation based on a wavelength-swept fiber laser," Smart Mater. Struct., 15:435-440.
Shimotsu et al., (1997). "Stabilized 20 GHz LiNbO3 Polarization Scrambler," Optics & Photopics News, 36:9091, 2 pages.
Extended European Search Report and Opinion received for European Patent Application No. 22176866.6 mailed on Dec. 5, 2022, 9 pages.
Meng et al., (2019). "SBS suppression in high brightness, all-fiberized and linearly polarized amplifiers by rectangular spectrum," SPIE Proceedings, 11046:1104605-1104605.

APPARATUS AND METHOD FOR SPECTRALLY SHAPING A LASER BEAM

TECHNICAL FIELD OF THE INVENTION

The present invention relates in general to master-oscillator power-amplifier (MOPA) laser systems. The invention relates in particular to spectrally shaping a laser beam from a master oscillator prior to amplification by a power amplifier in a fiber MOPA laser system.

DISCUSSION OF BACKGROUND ART

A common architecture for a high-power fiber laser is to have a low-power master oscillator providing "seed" laser radiation, which is amplified by one or more fiber preamplifiers, then further amplified by a power amplifier. Such fiber MOPA lasers can deliver output laser radiation having a power greater than 2 kilowatts (kW) in a single longitudinal mode (SLM). The master oscillator is typically a fiber resonator or wavelength-locked laser diode, such as a distributed feedback (DFB) or a distributed Bragg reflector (DBR) laser diode. In subsequent amplification, gain is provided by optically-active ions such as neodymium ($Nd^{3+}$), ytterbium ($Yb^{3+}$), thulium ($Tm^{3+}$), or erbium ($Er^{3+}$), which are doped into the cores of amplifier fibers. The optically-active ion is selected to provide the desired output wavelength. For example, neodymium and ytterbium ions provide gain at near-infrared wavelengths, between 1.0 micrometers (μm) and 1.1 μm.

For laser radiation having a narrow spectral bandwidth and a long temporal coherence, stimulated Brillouin scattering (SBS) can cause back reflections that reduce efficiency and ultimately limit the output power that can be obtained from an amplifier. Such back reflections can permanently damage the fiber laser and render it inoperative. Brillouin scattering occurs when coherent laser radiation generates phonons in the core of an optical fiber. A photon of the forward-propagating laser radiation generates a phonon and a Stokes-shifted backwards-propagating photon, which has lower energy than the forward-propagating photon due to conservation of energy and propagates in the opposite direction due to phase matching. The frequency difference between the forward-propagating and backward-propagating radiation corresponds to the phonon frequency, known as the "Brillouin frequency shift". The forward-propagating and backward-propagating radiation can interfere, creating a traveling refractive-index grating by electrostriction. The contrast in refractive-index grating depends on the degree of temporal coherence imparted onto the backwards-propagating radiation and its intensity.

For forward-propagating laser radiation having a narrow spectral bandwidth, a long temporal coherence, and sufficient intensity, the accumulated phonon density causes the Brillouin scattering to become stimulated and the backward-propagating beam experiences nonlinear gain. Further increasing the intensity of the forward-propagating laser radiation improves contrast in the refractive-index grating. The intensity of the backward-propagating beam can become comparable to the forward-propagating beam in a sufficiently long optical fiber. If SBS occurs in an amplifier fiber or a subsequent optical fiber, the backward-propagating beam can permanently damage an oscillator, a lower-power amplifier, or an optical isolator. In fused silica, the Brillouin frequency shift is typically about 15 gigahertz (GHz) and the Brillouin gain bandwidth is typically about 50 megahertz (MHz).

Techniques for suppressing SBS include increasing the effective mode area of an optical fiber while reducing the numerical aperture, chemically modifying the core material along an optical fiber, creating temperature gradients along an optical fiber, minimizing the length of a gain fiber by increasing the absorbance of pump radiation, and frequency chirping the laser radiation. Another common technique, in particular for high-power lasers, is to spectrally broaden the laser radiation before it seeds an amplifier. For example, by propagating the laser radiation through an optical phase modulator driven by a radio-frequency (RF) electrical signal. However, output laser radiation having a narrow spectral bandwidth is often required from a fiber MOPA, which limits the amount of spectral broadening that can be applied to the laser radiation prior to amplification. For example, when spectrally combining output laser radiation from multiple fiber MOPA lasers to further scale the output power.

Another related technique for suppressing SBS is to seed amplifiers with laser radiation that lacks a well-defined optical polarization. Such radiation may be referred to as "unpolarized" or "polarization scrambled." Methods and apparatus that scramble polarization without causing self-phase modulation and excessive spectral broadening are described in U.S. Patent Publication No. 2020/0335928, assigned to the assignee of the present invention and the complete disclosure of which is incorporated herein by reference.

SUMMARY OF THE INVENTION

Figure 1:
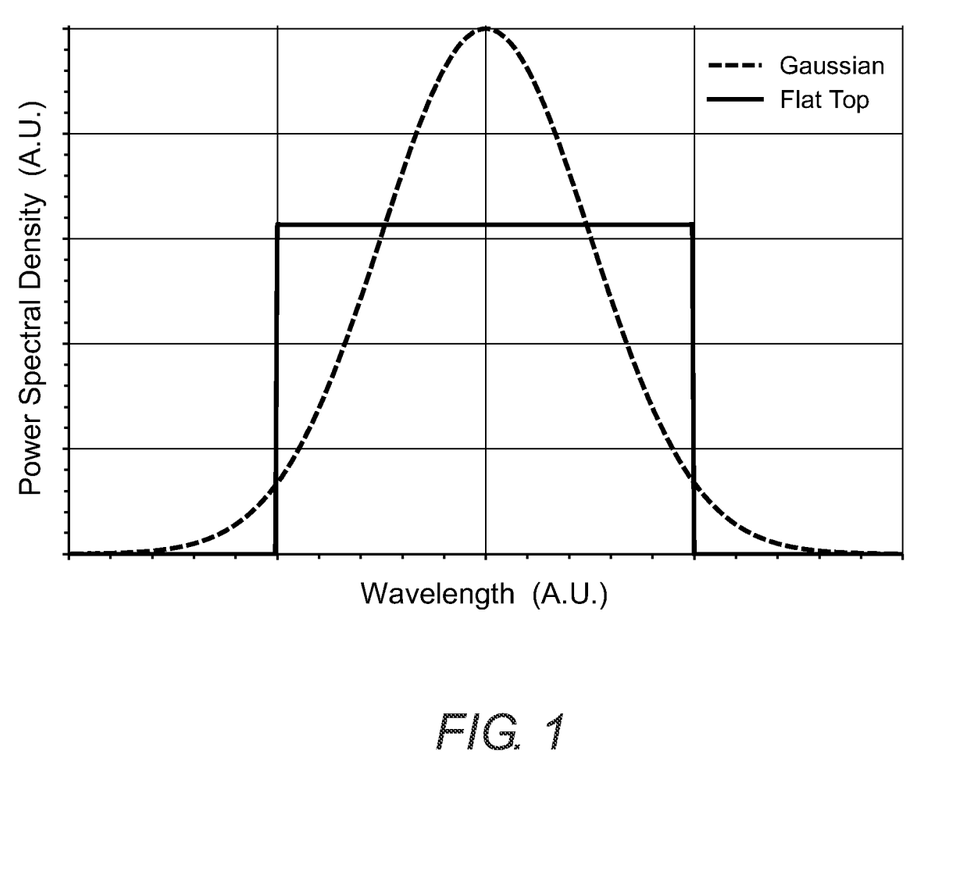
FIG. 1 is a graph schematically illustrating power spectral density vs. wavelength for a Gaussian spectral distribution and a flat-top spectral distribution having the same power and same $1/e^2$ linewidth.

A fundamental property of SBS is that gain for the Brillouin-frequency-shifted backward-propagating radiation depends on the power spectral density of the forward-propagating radiation. Laser radiation produced by master oscillators usually has a Gaussian, Lorentzian, or similarly peak-shaped spectral distribution. In contrast, the highest threshold for undesirable SBS corresponds to a uniform spectral distribution, also known as a "flat-top" spectral distribution. FIG. 1 compares the power spectral density of a Gaussian spectral distribution to a flat-top spectral distribution having the same power and same $1/e^2$ linewidth. Power is the area under each spectral distribution or equivalently the spectral distribution integrated over wavelength. The maximum power spectral density at the peak of the Gaussian distribution is 60% higher than the uniform power spectral density of the flat-top distribution. A fiber amplifier could generate 60% more amplified radiation when amplifying a laser beam having the flat-top distribution compared to the Gaussian distribution, without exceeding the threshold for SBS. For example, by energizing the amplifier fiber with more pump power.

Techniques that suppress SBS using an optical phase modulator typically use a white-noise electrical signal that has a Gaussian probability distribution to drive the phase modulator. The broadened spectrum of the laser radiation transmitted through the modulator has a Gaussian spectral distribution. There are modulation schemes that approximate flat-top spectral distributions, but these are more complex than modulating the probability distribution of common radio-frequency (RF) noise sources. One such scheme is proposed in the article "SBS suppression and coherence properties of a flat top optical spectrum in a high power fiber amplifier" by Anderson et al. in Proc. of SPIE 10083 (2017). It should be noted that the Gaussian spectral distribution is not caused by the Gaussian probability distribution of the white-noise source.

There is need for an optical device that transforms the Gaussian or similarly peak-shaped spectral distribution of laser radiation from a master oscillator into a flat-top spectral distribution for amplification in a fiber power amplifier. Preferably, the optical device would add minimal optical components, complexity, and cost to a fiber MOPA laser.

In one aspect, an optical apparatus for spectrally shaping a laser beam in accordance with the present invention comprises a birefringent optic and a linear polarizer. The birefringent optic has orthogonal first and second polarization axes. The birefringent optic is arranged to receive and transmit the laser beam. The laser beam received by the birefringent optic is linearly polarized and has an electric-field vector oriented at an oblique angle φ to the first polarization axis. The linear polarizer has a polarizing direction. The polarizer is arranged to receive the laser beam transmitted through the birefringent optic and to transmit a portion thereof. The polarizing direction is oriented at an oblique angle θ to the first polarization axis. The portion of the laser beam transmitted through the polarizer has a more-uniform power spectral density than the laser beam received by the birefringent optic. Transmission through the birefringent optic induces a wavelength-dependent phase shift between a component of the laser beam parallel to the first polarization axis and a component of the laser beam parallel to the second polarization axis. The wavelength-dependent phase shift produces a wavelength-dependent polarization state of the laser beam transmitted through the birefringent optical element, thereby modulating power spectral density in the portion of the laser beam transmitted through the polarizer.

In another aspect, a MOPA laser in accordance with the present invention comprises a seed laser for providing a linearly-polarized laser beam and a birefringent optic for receiving and transmitting the laser beam. The birefringent optic has orthogonal first and second polarization axes. The laser beam received by the birefringent optic has an electric-field vector oriented at an oblique angle φ to the first polarization axis. A linear polarizer has a polarizing direction. The polarizer is arranged to receive the laser beam transmitted through the birefringent optic and to transmit a portion thereof. The polarizing direction is oriented at an oblique angle θ to the first polarization axis. The portion of the laser beam transmitted through the polarizer has a more-uniform power spectral density than the laser beam provided by the seed laser. An amplifier receives the portion of the laser beam transmitted through the polarizer and generates an amplified laser beam. The amplified laser beam has more power than the laser beam provided by the seed laser. Transmission through the birefringent optic induces a wavelength-dependent phase shift between a component of the laser beam parallel to the first polarization axis and a component of the laser beam parallel to the second polarization axis. The wavelength-dependent phase shift produces a wavelength-dependent polarization state of the laser beam transmitted through the birefringent optical element, thereby modulating power spectral density in the portion of the laser beam transmitted through the polarizer.

In yet another aspect, a method for spectrally shaping a laser beam in accordance with the present invention comprises delivering a linearly-polarized laser beam to a birefringent optic. The linearly-polarized laser beam has an electric-field vector. The birefringent optic has orthogonal first and second polarization axes. The linearly-polarized laser beam received by the birefringent optic is divided into a component parallel to the first polarization axis and another component parallel to the second polarization axis by orienting the electric-field vector between the first and second polarization axes. The laser beam is transmitted through the birefringent optic to induce a wavelength-dependent phase shift between the components parallel to the first and second polarization axes. The wavelength-dependent phase shift produces a wavelength-dependent polarization state of the laser beam transmitted through the birefringent optic. The laser beam transmitted through the birefringent optic is delivered to a linear polarizer. The polarizer has a polarizing direction oriented between the first and second polarization axes. A portion of the laser beam received by the polarizer is transmitted therethrough, the transmitted portion having a modulated power spectral density that is more uniform than the laser beam received by the birefringent optic.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 2:
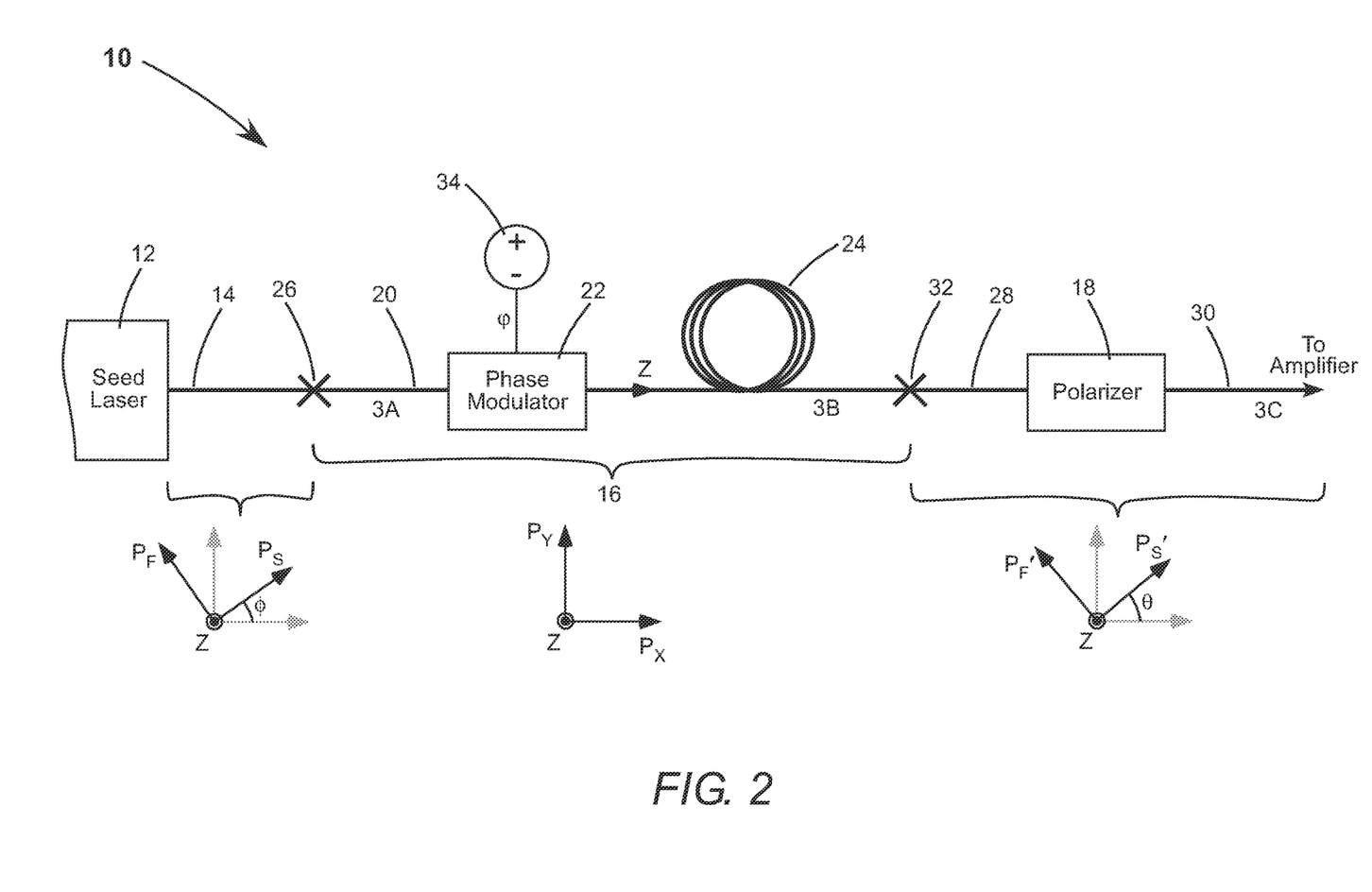
FIG. 2 is a block diagram schematically illustrating one preferred embodiment of optical apparatus in accordance with the present invention for spectrally shaping a laser beam provided by a seed laser, including a birefringent optic and a linear polarizer, with the birefringent optic including a phase modulator and a polarization-maintaining optical fiber.

Referring now to the drawings, wherein like components are designated by like numerals, FIG. 2 is a block diagram schematically illustrating one preferred embodiment 10 of optical apparatus in accordance with the present invention for spectrally shaping a laser beam provided by a seed laser 12. Relative orientations of the polarization axes for polarized optical elements are also indicated on the drawing, below the block diagram, with a Z propagation axis directed out of the page. The polarization axes are orthogonal to the Z propagation axis. Curly brackets indicate optical elements that correspond to each set of polarization axes. The laser beam propagates from left to right along the Z propagation axis in the block diagram.

Seed laser 12 may be a master oscillator or a master oscillator combined with one or more preamplifiers. The laser beam is delivered to optical apparatus 10 through a polarization-maintaining optical fiber 14. The laser beam is linearly polarized within optical fiber 14, with the electric-field vector parallel to either a slow axis or a fast axis of optical fiber 14, which corresponds respectively to a slow-axis polarization $P_S$ or a fast-axis polarization $P_F$. Propagation in slow-axis polarization $P_S$ is preferred, because it is generally more robust against depolarization by externally applied stress and is used in the examples herein.

Optical apparatus 10 includes a birefringent optic 16 and a linear polarizer 18. Birefringent optic 16 receives and transmits the laser beam from seed laser 12. Here, birefringent optic 16 includes a relatively-short polarization-maintaining optical fiber 20, a phase modulator 22, and a relatively-long polarization-maintaining optical fiber 24. Phase modulator 22 includes a birefringent electro-optic crystal, such as a lithium niobate ($LiNbO_3$) crystal, which has orthogonal principal axes. Herein, the principal axes are labeled "X" and "Y". There are corresponding orthogonal polarization axes "$P_X$" and "$P_Y$" for light having an electric-field vector parallel thereto. The refractive indices of the electro-optic crystal and therefore the propagation velocities for light therethrough are different for polarizations $P_X$ and $P_Y$. This velocity difference is known in the art as "polarization mode dispersion" and it produces a "differential group delay" between light in polarizations $P_X$ and $P_Y$. The linearly-polarized laser beam received by birefringent optic 16 has an electric-field vector oriented at an oblique angle φ between polarizations $P_X$ and $P_Y$. The laser beam propagating through birefringent optic 16 therefore has components in both polarizations $P_X$ and $P_Y$.

Phase modulator 22 and optical fiber 24 both contribute polarization mode dispersion. The birefringent axes of polarization-maintaining optical fibers 20 and 24 are aligned with the polarization axes of phase modulator 22. The polarization axis of phase modulator 22 that has the higher refractive index corresponds to longest optical path length therethrough. Similarly, a slow-axis of optical fiber 24 corresponds to the longest optical path length therethrough. Aligning these axes of phase modulator 22 and optical fiber 24 maximizes the overall polarization mode dispersion of birefringent optic 16. That is, aligning these axes produces the maximum difference in optical path length for polarization $P_X$ compared to polarization $P_Y$.

Optical fiber 14 of seed laser 12 and optical fiber 20 of birefringent optic 16 are joined by a splice 26 having a splice angle φ. Slow axis $P_S$ and fast axis $P_F$ of optical fiber 14 are rotated by an angle φ from polarization axes $P_X$ and $P_Y$ of birefringent optic 16. This rotation is fixed when forming splice 26, by deliberately misaligning the birefringent axes of the two fibers, which is accomplished by misaligning stress rods therein. The linearly-polarized laser beam is thereby launched into birefringent optic 16 having a component in polarization $P_X$ and another component in polarization $P_Y$. Propagation through birefringent optic 16 produces a phase shift between the components in polarizations $P_X$ and $P_Y$ due to polarization mode dispersion. This phase shift is wavelength dependent, as discussed below, producing a wavelength-dependent polarization. Herein below, "frequency" will be used instead of "wavelength" for convenience of explanation, however, these quantities are equivalent for analyzing spectra of optical radiation.

Polarizer 18 receives the laser beam transmitted through birefringent optic 16. In the embodiment depicted, polarizer 18 is in the form of a fiber-coupled component that includes polarization-maintaining optical fibers 28 and 30. The birefringent axes of optical fibers 28 and 30, which correspond to a slow-axis polarization $P_{S'}$ and a fast-axis polarization $P_{F'}$, are aligned with the optical axes of polarizer 18. The optical axes define a polarizing direction of polarizer 18. One of polarizations $P_{S'}$ and $P_{F'}$, which is aligned the polarization direction, passes through polarizer 18. The other polarization is blocked. It is preferred to align the more-robust slow-axis polarization $P_{S'}$ with the polarizing direction of polarizer 18, as in the examples herein.

Optical fiber 24 of birefringent optic 16 and optical fiber 28 of polarizer 18 are joined by a splice 32 having a splice angle θ. Slow axis $P_{S'}$ and fast axis $P_{F'}$ of optical fiber 28 are rotated by an angle θ from polarization axes $P_X$ and $P_Y$ of birefringent optic 16 at a splice 32. The polarizing direction of polarizer 18 is thereby oriented at an oblique angle θ between polarizations $P_X$ and $P_Y$ of birefringent optic 16. Optical fiber 30 enables the laser beam propagating out of optical apparatus 10 to be conveniently transported to and coupled into a power amplifier.

Figures 3A, 3B, 3C:
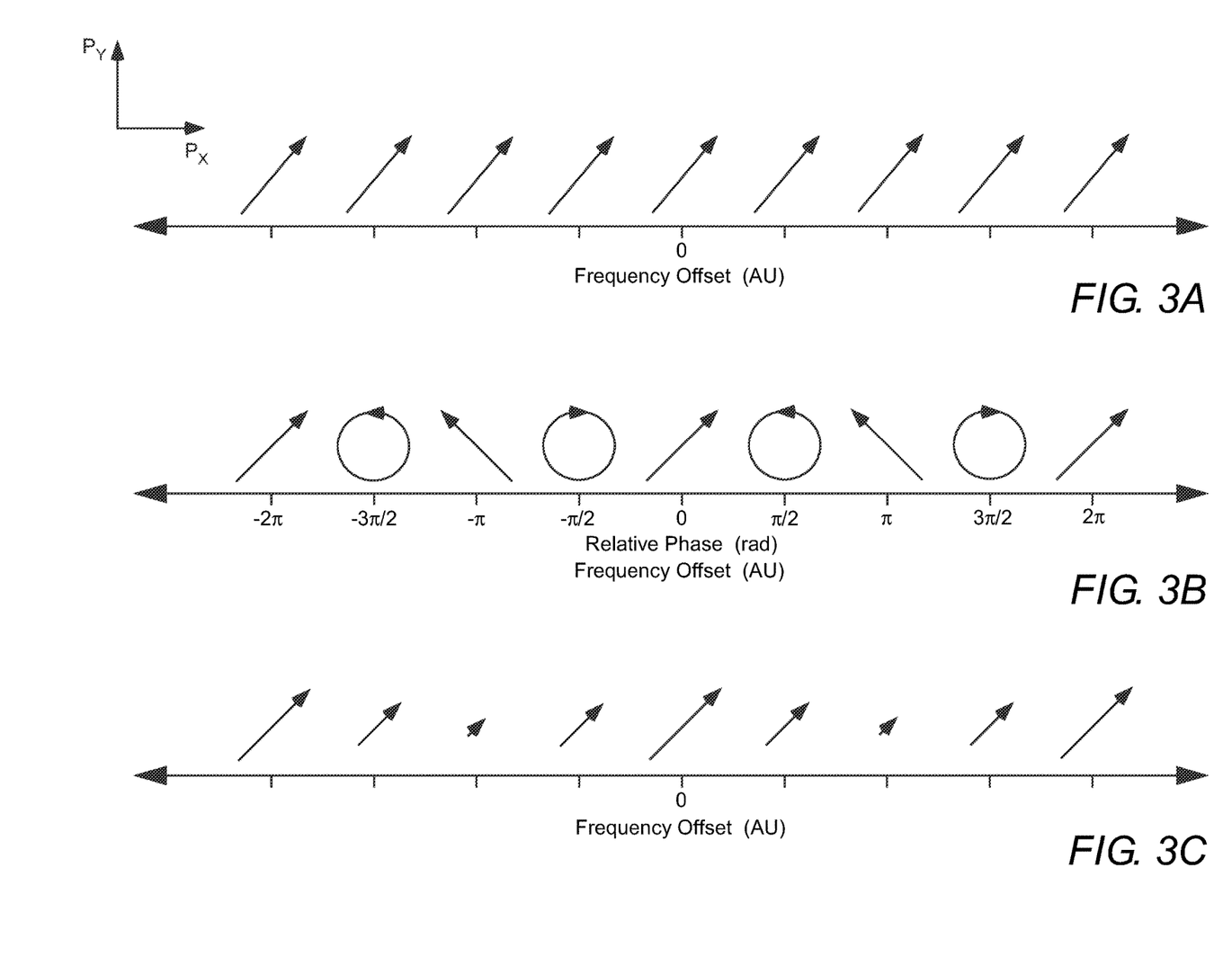
FIGS. 3A, 3B, and 3C schematically illustrate power spectral density and polarization at three locations indicated on FIG. 2 on a common frequency scale.

FIGS. 3A-3C schematically illustrate power spectral density and polarization as a function of frequency at three labeled locations in one example of optical apparatus 10 of FIG. 2, having angle φ≈45° and angle θ≈45°, selected to demonstrate effects of polarization mode dispersion in birefringent optic 16. In the drawings, polarization axis $P_X$ is horizontal and polarization axis $P_Y$ is vertical. Lines with arrows depict linearly-polarized light. Circles with arrows depict circularly-polarized light. The length of a line or diameter of a circle indicates the power spectral density. The arrows indicate the direction of polarization. In this example, the laser beam provided by seed laser 12 is "white light", which has a power spectral density that is independent of frequency.

At location 3A in optical fiber 20, for angle φ≈45°, the laser beam launched into birefringent optic 16 has equal power and the same phase in polarizations $P_X$ and $P_Y$. Propagation through birefringent optic 16 introduces a phase shift between the components of the laser beam in polarizations $P_X$ and $P_Y$ that is frequency dependent. The power spectral density is unchanged. At location 3B, towards the end of optical fiber 24, the polarization state varies continuously with frequency. For example, over 2π radians (rad) of relative phase shift, the polarization state varies from a linear polarization (0 rad), to a circular polarization (π/2 rad), to the orthogonal linear polarization (π rad), to the opposite-direction circular polarization ($3\pi/2$ rad), and back to the original linear polarization ($2\pi$ rad). For relative phase shifts therebetween, the polarization states will be elliptical. At location 3C, after the polarization-dispersed laser beam has propagated through polarizer 18, the polarization is purely linear and power spectral density varies with sinusoidally with frequency.

Figure 4:
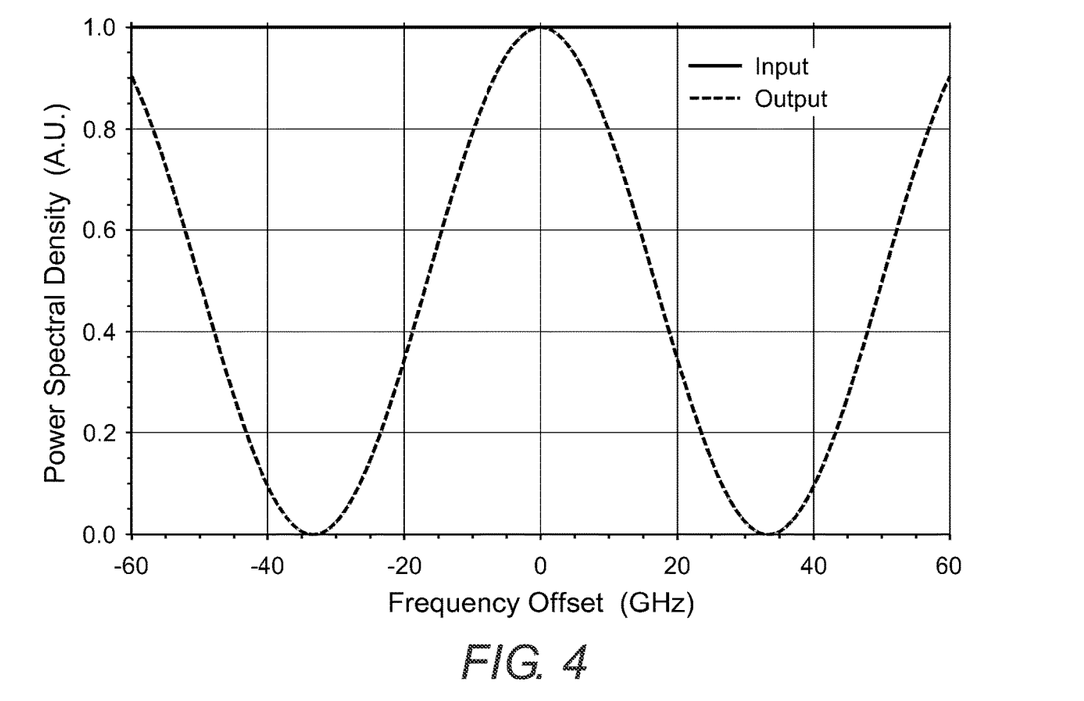
FIG. 4 is a graph schematically illustrating output power spectral density vs. frequency for an example of the optical apparatus in FIG. 2 having a white light input spectrum and splice angles φ=θ=45°.

FIG. 4 is a graph schematically illustrating power spectral density vs. frequency for the same example of optical apparatus 10 as FIGS. 3A-3C, having specifically a center frequency of 280 terahertz (THz) and a group delay time between polarizations $P_X$ and $P_Y$ of 15 picoseconds (ps). "Frequency offset" on the graph is an offset from the center frequency $\omega_c$. Group delay time $\tau$ is a difference in propagation time from splice 26 to splice 32. In this example, the input laser beam delivered from seed laser 12, through splice 26, into birefringent optic 16 is white light having a constant power spectral density. The splice angle $\phi=45°$ means that power is coupled equally into polarizations $P_X$ and $P_Y$ of birefringent optic 16. As expected, the power spectral density of the output laser beam transmitted through polarizer 18 has a sinusoidal dependence on frequency. Optical apparatus 10 is essentially a spectral filter and the "output" plot in FIG. 4 is essentially a transmission spectrum. In the example depicted, there is 100% transmission of the laser beam through optical apparatus 10 at the maxima and 100% extinction of the laser beam at the minima.

Figure 5:
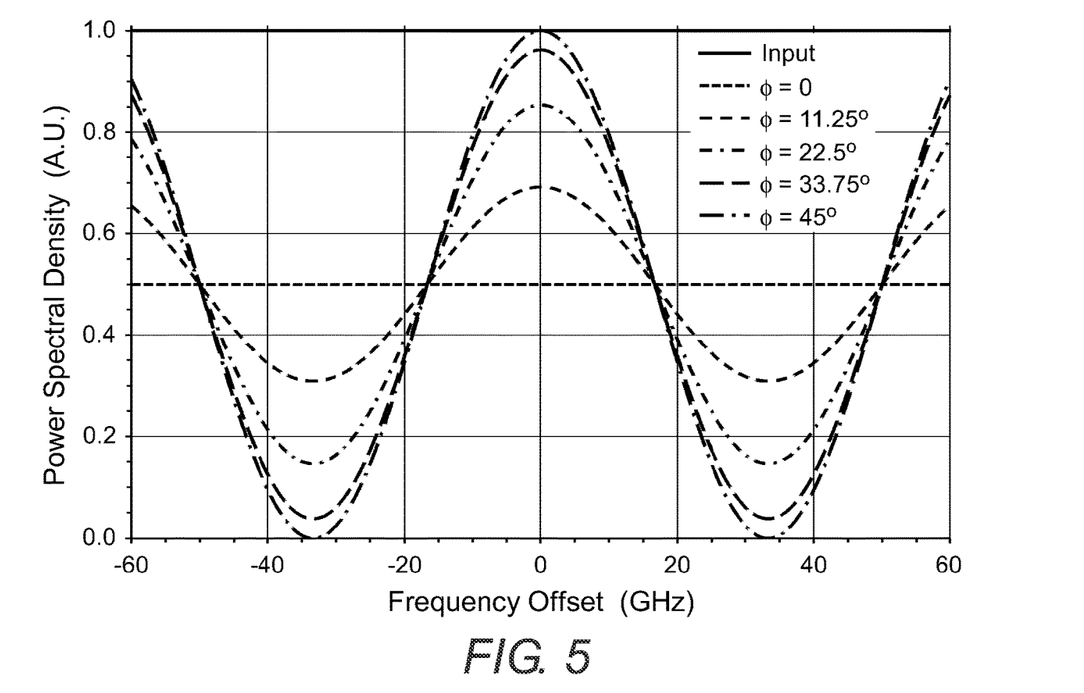
FIG. 5 is a graph schematically illustrating output power spectral density vs. frequency for an example of the optical apparatus in FIG. 2 having a white light input spectrum, an angle θ=45°, and different labeled angles φ.

FIG. 5 is a graph schematically illustrating power spectral density vs. frequency for an example of optical apparatus 10, having the same 280 THz center frequency and the same 15 ps group delay time, angle $\theta=45°$, and different labeled angles $\phi$. The average transmission when $\theta \approx 45°$ is always 50%. For angle $\phi=0°$, transmission is invariant with frequency. For angle $\phi=45°$, which is the example depicted in FIG. 4, transmission varies between complete transmission and complete extinction. For other angles $\phi$, the transmission spectra are between these two extremes.

Figure 6:
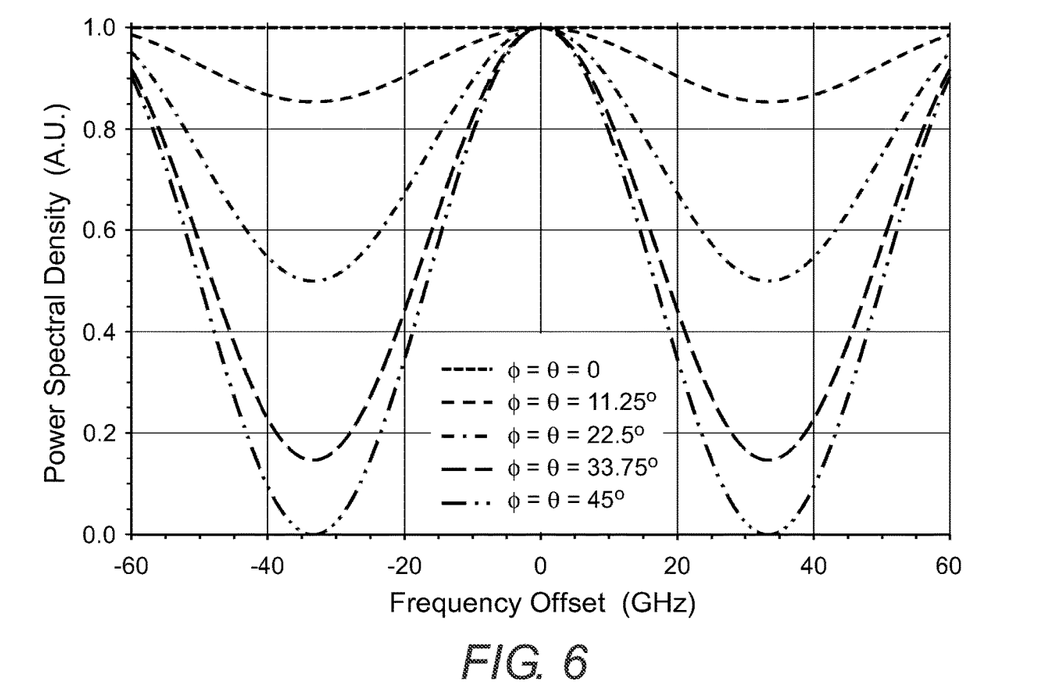
FIG. 6 is a graph schematically illustrating output power spectral density vs. frequency for an example of the optical apparatus in FIG. 2 having a white light input spectrum and different labeled angles φ=θ.

FIG. 6 is a graph schematically illustrating power spectral density vs. frequency for an example of optical apparatus 10, having the same 280 THz center frequency and the same 15 ps group delay time, and different values of angles $\phi$ and $\theta$ that are varied synchronously. Angle $\phi$ is about equal to angle $\theta$. The input laser beam, not depicted, is again white light having a constant power spectral density. For angles $\phi=\theta=0°$, there is complete transmission at all frequencies. For angles $\phi=\theta=45°$, which is again the example depicted in FIG. 4, transmission varies between complete transmission and complete extinction, with an average transmission of 50%. For other angles $\phi=\theta$, there is less extinction at the minima and the average transmission is higher. Angles $\phi=\theta=45°$ provide the most spectral shaping of a transmitted laser beam, but also produce the highest overall insertion loss of about 3 decibels (dB).

Phase modulator 22 in FIG. 2 is driven by an electric potential from a source 34 thereof. Applying the electric potential across the birefringent electro-optic crystal in phase modulator 22 will change the refractive index of one of polarizations $P_X$ and $P_Y$ through the electro-optic effect, which causes a phase delay between components of a laser beam in polarizations $P_X$ and $P_Y$ propagating through birefringent optic 16. This phase delay adds to or subtracts from the phase shift discussed above. The phase shift is frequency dependent and inherent to birefringent optic 16, whereas source 34 enables an arbitrary phase delay to be applied to birefringent optic 16.

Figure 7:
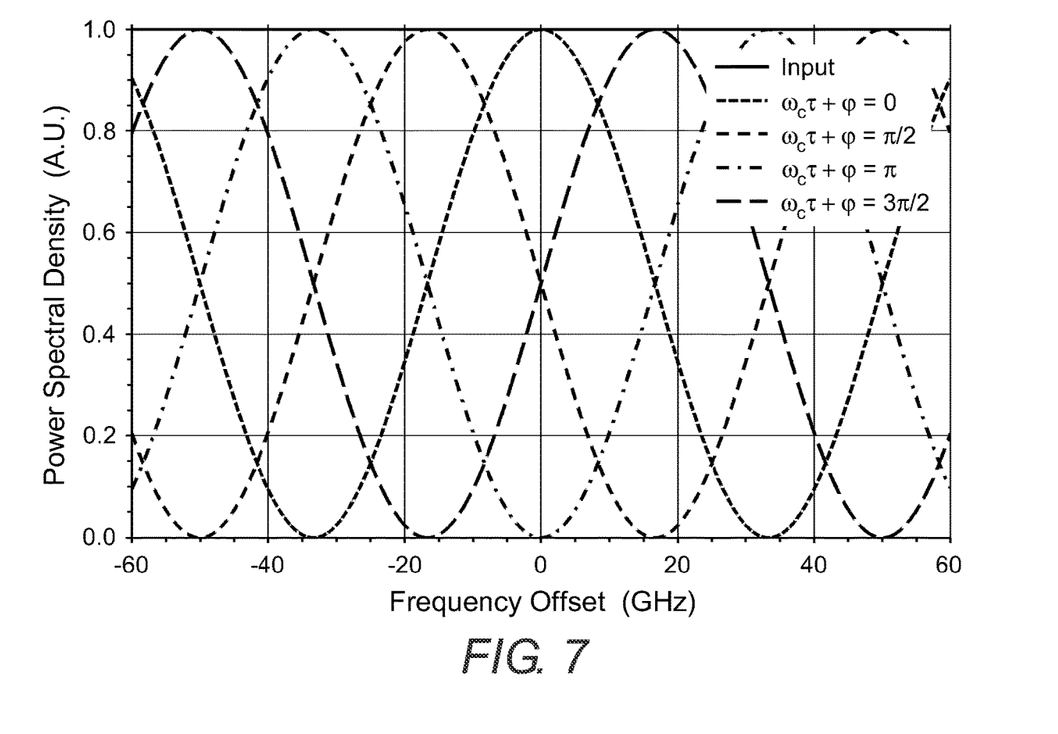
FIG. 7 is a graph schematically illustrating output power spectral density vs. frequency for an example of the optical apparatus in FIG. 2 having a white light input spectrum, angles φ=θ=45°, and different labeled phase delays $\omega_c\tau+\varphi$.

FIG. 7 is a graph schematically illustrating power spectral density vs. frequency for the same example of optical apparatus 10 as FIG. 4, with angles $\phi=\theta=45°$, but for different values of a constant phase $\varphi$ induced by applying a DC electric potential to phase modulator 22. This constant phase $\varphi$ is assumed to be independent of frequency and adds to a frequency-dependent phase $\omega\tau$ caused by the differential group delay between polarizations $P_X$ and $P_Y$. A phase delay $\omega_c\tau+\varphi$, evaluated at center frequency $\omega_c$, may be used to characterize the transmission spectrum of optical apparatus 10. The drawing demonstrates that varying phase $\varphi$, while keeping center frequency $\omega_c$ and group delay time $\tau$ fixed, displaces the transmission spectrum in frequency without changing the maximum or minimum transmission. Herein below, phase delay $\omega_c\tau+\varphi$ refers to a net displacement in phase of the orthogonal polarizations with respect to each other at center frequency $\omega_c$, after considering any portion of the overall phase displacement that is an integer multiple of $2\pi$ rad. A phase displacement of $2\pi$ rad does not modify the spectral shape of a laser beam traversing optical apparatus 10.

Figure 8:
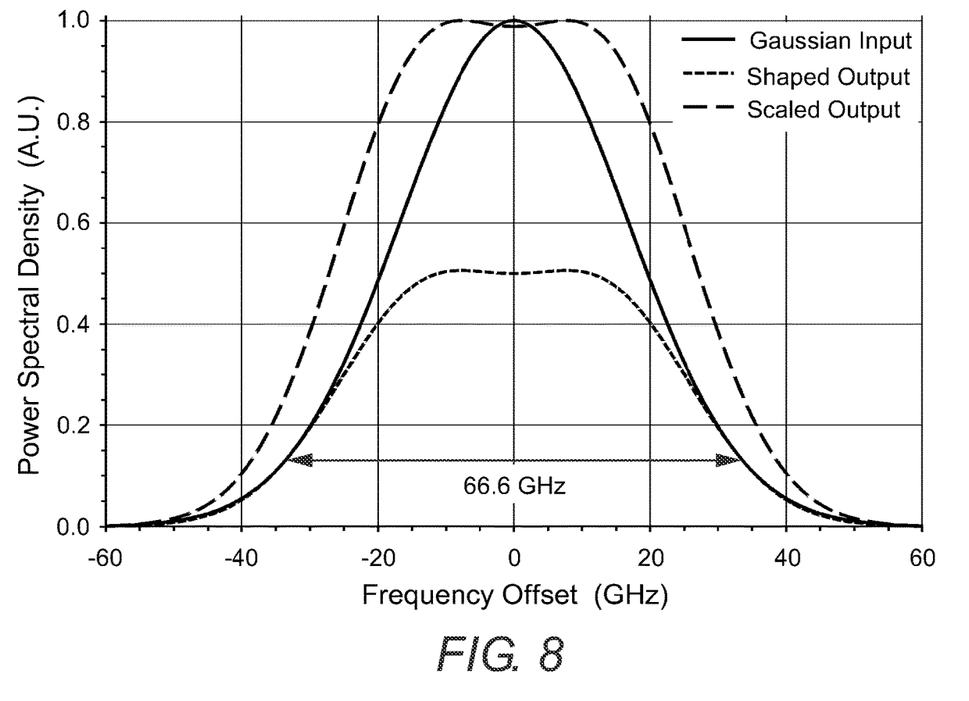
FIG. 8 is a graph schematically illustrating power spectral density vs. frequency for an example of the optical apparatus in FIG. 2 having the Gaussian input spectrum depicted with a linewidth of 66.6 GHz, angles φ=θ=22.5°, and phase delay $\omega_c\tau+\varphi=\pi$ rad.

In a fiber MOPA laser, the master oscillator generally produces a laser beam having a Gaussian or similarly shaped power spectral density. Optical apparatus 10 of FIG. 2 can be configured to reshape the power spectral density of such a laser beam to be closer to an ideal flat-top. FIG. 8 is a graph schematically illustrating power spectral density vs. frequency for another example of optical apparatus 10, with birefringent optic 16 having a group delay time of 15 ps, angles $\phi=\theta=22.5°$, and phase delay $\omega_c\tau+\varphi=\pi$ rad. Seed laser 12 provides a Gaussian-shaped laser beam having a center frequency of 280 THz (equivalent to a wavelength of about 1071 nm) and a $1/e^2$ linewidth of 66.6 GHz. The drawing compares this Gaussian input laser beam to the output laser beam that is reshaped by transmission through optical apparatus 10.

The shaped output laser beam has a relatively flat top that spans about 30 GHz, with a power spectral density about half that at the peak of the Gaussian input laser beam. The shaped output beam is to be amplified in a subsequent power amplifier, so power losses incurred during transmission through optical apparatus 10 can be overcome. More importantly, the spectrally-shaped output laser beam can ultimately be amplified to a higher power due to its more-uniform spectrum, without exceeding a threshold for SBS. This uniformity is illustrated in FIG. 8, by scaling the shaped output to have the same peak power spectral density as the Gaussian input. The area under the power spectral density plot of the scaled shaped output is about 34% greater than the Gaussian input, which means about 34% more power is accessible by subsequent amplification, without generating SBS.

Figure 9:
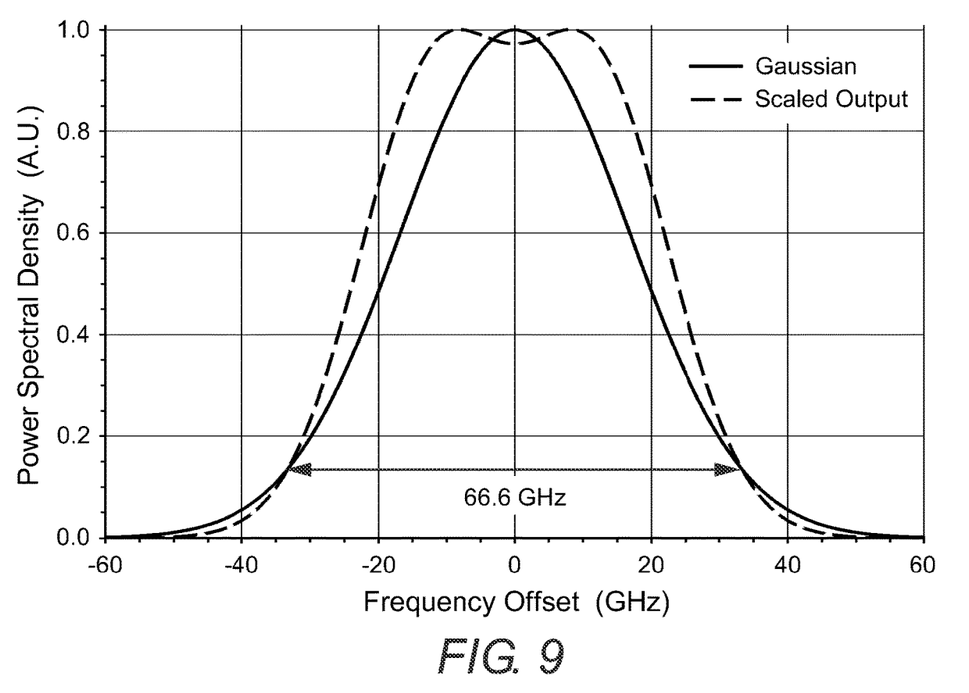
FIG. 9 is a graph schematically illustrating power spectral density vs. frequency for an example of the optical apparatus in FIG. 2 having a Gaussian input spectrum with a linewidth of 55.0 GHz, angles φ=θ=25.9°, and phase delay $\omega_c\tau+\varphi=\pi$ rad.

The scaled shaped output in FIG. 8 also has a greater $1/e^2$ linewidth than the Gaussian input. In some applications, such as spectral beam combining, such a large increase in linewidth is undesirable. FIG. 9 is a graph schematically illustrating power spectral density vs. frequency for yet another example of optical apparatus 10, with birefringent optic 16 having a group delay time of 15 ps, angles $\phi=\theta=25.9°$, and phase delay $\omega_c\tau+\varphi=\pi$ rad. The Gaussian input laser beam has a narrower linewidth than the example of FIG. 8, with a $1/e^2$ linewidth of 55.0 GHz, and the same center frequency of 280 THz. The input linewidth, angles, and phase were selected to achieve an output laser beam having the same 66.6 GHz $1/e^2$ linewidth as the input laser beam provided by seed laser 12 in the example of FIG. 8. In FIG. 9, the area under the power spectral density plot of the scaled shaped output is about 17% greater than a 66.6 GHz Gaussian beam, which means about 17% more power is accessible by subsequent amplification, without exceeding the desired 66.6 GHz linewidth of the laser beam for subsequent amplification.

The examples of FIGS. 8 and 9 illustrate that the transmission spectrum of optical apparatus 10 can be tuned by varying the values of angles $\phi$ and $\theta$ and phase $\varphi$. Birefringent optic 16 induces a frequency-dependent phase shift between the components of the laser beam in polarizations $P_X$ and $P_Y$ and produces a frequency-dependent polarization state in the laser beam transmitted therethrough. Polarizer 18, in turn, modulates the power spectral density of a portion of the laser beam transmitted therethrough. By optimizing angles $\phi$ and $\theta$, and phase $\varphi$, the portion of the laser beam transmitted through polarizer 18 has a more-uniform power spectral density than the original laser beam received by birefringent optic 16. In both of these examples, angle $\phi$ is about equal to angle $\theta$, and phase delay $\omega_c\tau+\varphi$ is about $\pi$ rad.

Angles $\phi=\theta$ between 19° and 30° were found to be favorable for this type of spectral shaping. Angles $\phi=\theta$ between 22° and 27° were found to be even more favorable. Preferably, angle $\phi$ differs from angle $\theta$ by less than 5° ($|\theta-\phi|<5°$), and most preferably by less than 3° ($|\theta-\phi|<3°$). Preferably, phase delay $\omega_c\tau+\varphi$ is in a range between $7\pi/8$ and $9\pi/8$ rad, and most preferably in a range between $15\pi/16$ and $17\pi/16$ rad.

Returning to FIG. 2, in some embodiments birefringent optic 16 may include only one of phase modulator 22 or optical fiber 24, since both of these elements provide polarization mode dispersion. An embodiment having only optical fiber 24 has an advantage of being less expensive to manufacture. Polarization-maintaining optical fiber typically provides about 1 picosecond per meter (ps/m) of polarization mode dispersion. An advantage of embodiments that include optical fiber 24 is that the group delay time of birefringent optic 16 can be adjusted by simply cutting optical fiber 24 to a corresponding length.

In embodiments including both phase modulator 22 and optical fiber 24, the order of these elements may be interchanged, with the laser beam propagating first through optical fiber 24 and then through phase modulator 22. The length of optical fiber 24 and the orientation of its birefringent axes with respect to the polarization axes of phase modulator 22 can be selected to add to or subtract from the fixed group delay time of phase modulator 22. The 15 ps group delay time used in the examples above is typical for a commercially available phase modulator. Embodiments that include phase modulator 22 can add or subtract phase $\varphi$ for tuning the transmission spectrum of optical apparatus 10 by simply applying an electric potential to phase modulator 22, as discussed above.

Optical fiber 14 may be omitted and optical fiber 20 joined directly to seed laser 12 to fix angle $\phi$. Similarly, optical fiber 20 may be omitted and optical fiber 14 joined directly to phase modulator 22 to fix angle $\phi$. Typically, a commercial seed laser would include optical fiber 14, and optical fiber 20 would be incorporated into a commercial fiber-coupled phase modulator. Therefore, joining optical fibers 14 and 20 at splice 26 is a convenient way to fix angle $\phi$. Optical fiber 28 may be omitted and optical fiber 24 joined directly to polarizer 18. Again, a commercial fiber polarizer typically includes optical fiber 28, so joining optical fibers 24 and 28 at splice 32 is a convenient way to fix angle $\theta$. Commercial fiber polarizers commonly provide linear extinction ratios that exceed 20 dB.

To better understand the operation of optical apparatus 10, it is useful to express the electric field of the laser beam as a traveling wave and a vector quantity $\vec{E}$, having components $E_X$ and $E_Y$ that correspond to the orthogonal polarizations $P_X$ and $P_Y$ of birefringent optic 16. After propagation through birefringent optic 16:

$$E_X = E\sin\left(\frac{2\pi n_X L}{\lambda} - \omega t\right) \tag{1}$$

$$E_Y = E\sin\left(\frac{2\pi n_Y L}{\lambda} - \omega t\right), \tag{2}$$

where $n_X$ and $n_Y$ are the respective refractive indices. Birefringent optic 16 has a fixed group delay time $\tau$, which is the difference in propagation time for the two electric-field components $E_X$ and $E_Y$ traversing the whole length L thereof:

$$\tau = \frac{\Delta n L}{c}, \tag{3}$$

where $\Delta n$ is the difference between refractive indices $n_X$ and $n_Y$. Therefore, $E_Y$ can be expressed as:

$$\begin{aligned}E_Y &= E\sin\left(\frac{2\pi(n_X + \Delta n)L}{\lambda} - \omega t\right) \\ &= E\sin\left(\frac{2\pi n_X L}{\lambda} + \frac{\omega \Delta n L}{c} - \omega t\right) \\ &= E\sin\left(\frac{2\pi n_X L}{\lambda} + \omega\tau - \omega t\right)\end{aligned} \tag{4}$$

to show that $E_Y$ has accumulated an additional phase $\omega\tau$ relative to $E_X$, which is dependent on frequency $\omega$. It is this additional frequency-dependent phase that produces the different polarization states illustrated in FIG. 3B.

Polarizer 18 receives the laser beam transmitted through birefringent optic 16 and transmits the portion thereof that is in the polarizing direction. Polarizer 18 thereby transforms the frequency-dependent polarization states into a modulated power spectral density. The polarizing direction of polarizer 18 is defined, here, by a unit vector $\hat{p}$ and is rotated by angle $\theta$ with respect to the $E_X$ component of electric field $\vec{E}$. Ignoring the spatial and time dependences of $\vec{E}$, the amplitude of the output electric field $\vec{E_O}$ can be expressed in terms of the components of $\vec{E}$, with the output intensity:

$$\begin{aligned}|\vec{E_O}|^2 &= |\vec{E}\cdot\hat{p}|^2 \\ &= \left|\binom{|E_X|}{|E_Y|\exp(i\omega\tau)}\cdot\binom{\cos(\theta)}{\sin(\theta)}\right|^2 \\ &= ||E_X|\cos(\theta) + |E_Y|\exp(i\omega\tau)\sin(\theta)|^2 \\ &= |E_X|^2\cos^2(\theta) + |E_Y|^2\sin^2(\theta) + 2|E_X||E_Y|\cos(\theta)\sin(\theta)\cos(\omega\tau)\end{aligned} \tag{5}$$

An extinction ratio $\varepsilon$, which is specifically the ratio between the maximum and minimum values in the power spectral density, can be extracted from Equation (5). In a logarithmic form, the extinction ratio (in decibels) is:

$$\varepsilon = \left|10\log\left(\frac{|E_X|^2\cos^2(\theta) + |E_Y|^2\sin^2(\theta) + 2|E_X||E_Y|\cos(\theta)\sin(\theta)}{|E_X|^2\cos^2(\theta) + |E_Y|^2\sin^2(\theta) - 2|E_X||E_Y|\cos(\theta)\sin(\theta)}\right)\right|. \tag{6}$$

Extinction ratio ε can be expressed in terms of the input electric field $\vec{E}_I$ provided by seed laser 12, which is rotated by angle ϕ with respect to the components of electric field $\vec{E}$, such that:

$$\vec{E}_I = \begin{pmatrix} E_I \cos\phi \\ E_I \sin\phi \end{pmatrix} \quad (7)$$

and $$\varepsilon = \left|10\log\left(\frac{\cos^2(\phi)\cos^2(\theta) + \sin^2(\phi)\sin^2(\theta) + 2\cos(\phi)\sin(\phi)\cos(\theta)\sin(\theta)}{\cos^2(\phi)\cos^2(\theta) + \sin^2(\phi)\sin^2(\theta) - 2\cos(\phi)\sin(\phi)\cos(\theta)\sin(\theta)}\right)\right| \quad (8)$$

Equation 8 is symmetrical with respect to angles ϕ and θ. Extinction ratio s has the same dependence on both angles. Therefore, as a practical matter, changing angle ϕ between the input electric-field $\vec{E}_I$ and polarization axis $P_X$ of birefringent optic 16 is equivalent to changing angle θ between the polarization axis $P_X$ and the polarizing direction p̂ of polarizer 18.

Equation (5) can also be rewritten in terms of the input electric field $\vec{E}_I$:

$$|\vec{E}_O|^2 = E_I^2 \cos^2(\phi)\cos^2(\theta) + E_I^2 \sin^2(\phi)\sin^2(\theta) + 2E_I^2 \cos(\phi)\sin(\phi)\cos(\theta)\sin(\theta)\cos(\omega\tau), \quad (9)$$

and used to determine power spectral density vs. frequency for different angles ϕ and θ, such as the plots in FIGS. 5 and 6. Including phase φ provided by phase modulator 22, which is added here to component $E_Y$, Equation (5) can be rewritten as:

$$|\vec{E}_O|^2 = E_I^2 \cos^2(\phi)\cos^2(\theta) + E_I^2 \sin^2(\phi)\sin^2(\theta) + 2E_I^2 \cos(\phi)\sin(\phi)\cos(\theta)\sin(\theta)\cos(\omega\tau+\varphi), \quad (10)$$

and used to determine plots for different phases φ, such as those in FIGS. 7-9. Numerical optimization methods can be applied with Equation 10 to determine values for angles ϕ and θ, phase φ, and group delay time τ to reshape a particular input spectrum to be closest to a desired output spectrum. In particular, these parameters can be optimized to maximize the threshold for SBS in any subsequent amplification.

Figure 10:
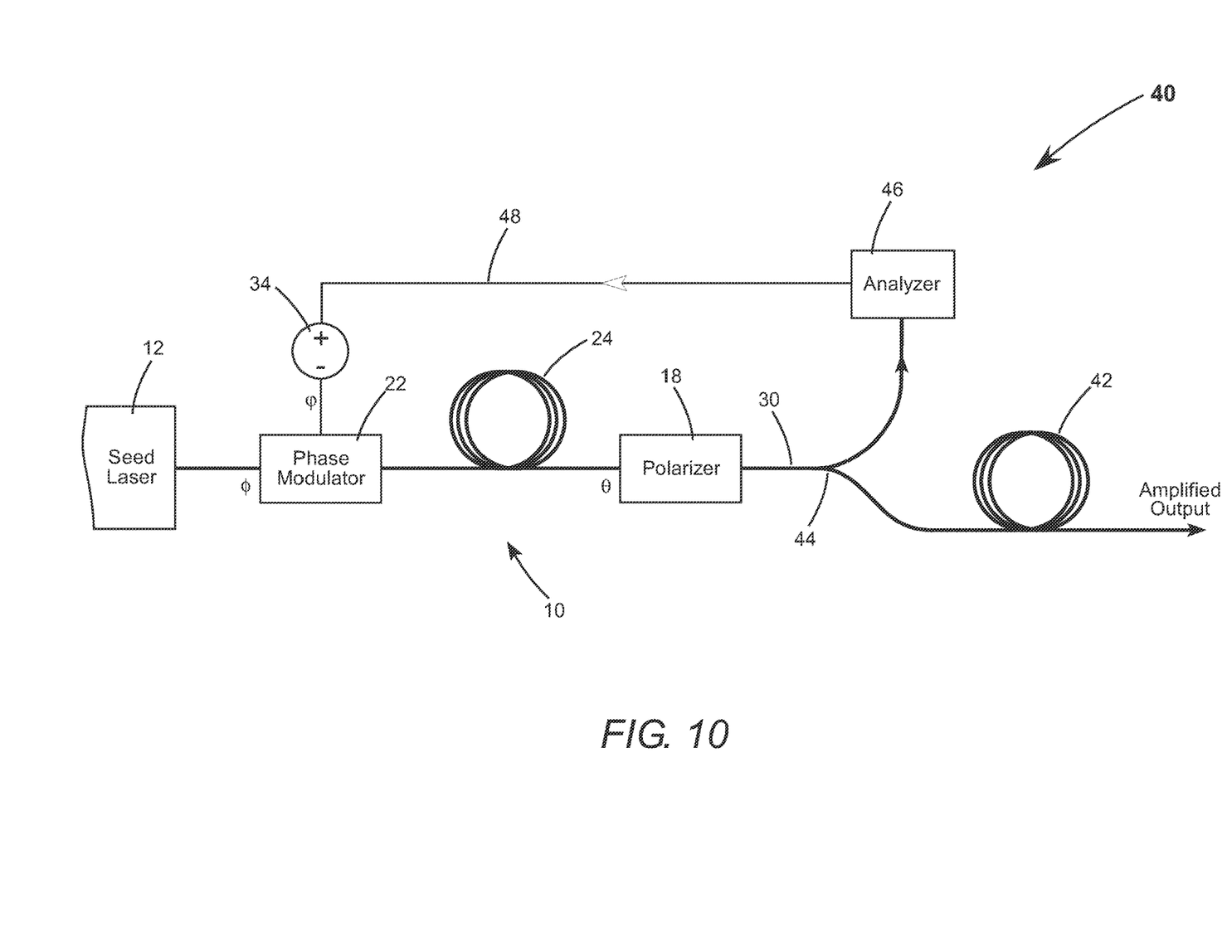
FIG. 10 is a block diagram schematically illustrating one preferred embodiment of MOPA laser in accordance with the present invention, including a seed laser, the optical apparatus of FIG. 2, an amplifier, and an active feedback circuit using a signal from an analyzer to adjust a phase φ added to the birefringent optic through the phase modulator.

FIG. 10 is a block diagram schematically illustrating one preferred embodiment 40 of MOPA laser in accordance with the present invention, which includes optical apparatus 10, a seed laser 12, and an amplifier 42. Amplifier 42 is depicted as a fiber amplifier, which may include a plurality of serially-arranged diode-pumped gain fibers. Optical apparatus 10 receives a laser beam from seed laser 12 and a portion of this laser beam is transmitted through and spectrally shaped by optical apparatus 10. Amplifier 42 receives the portion of the laser beam transmitted through optical apparatus 10 and generates an amplified laser beam having more power than the laser beam provided by seed laser 12. The transmitted portion of the laser beam preferably has a more-uniform power spectral density than the laser beam provided by seed laser 12. The amplified laser beam preferably has about the maximum power that can be safely generated by amplifier 42 without generating SBS.

Any thermal, mechanical, and acoustic stresses on the optical elements of birefringent optic 16 can change the phase delay between polarizations $P_X$ and $P_Y$ thereof. An active feedback circuit may be necessary to compensate for these stresses and maintain a desired phase delay $\omega_c\tau+\varphi$. MOPA laser 40 optionally includes a splitter 44 in optical fiber 30 to separate a small fraction the laser beam transmitted through optical apparatus 10. The separated fraction is guided to an optional analyzer 46 to determine any deviation of the actual phase delay from desired phase delay $\omega_c\tau+\varphi$. After measuring the deviation, analyzer 46 would send a signal 48 to source 34 to adjust the electric potential applied to phase modulator 22 and minimize that deviation. Signal 48 could be an error signal or a control signal, depending on the capabilities of source 34.

Analyzer 46 may incorporate heterodyne detection to resolve selected frequency components within the separated fraction of the laser beam. For example, heterodyne detection using a Mach-Zehnder interferometer. However, in some arrangements, a power measurement by a photodiode in analyzer 46 may be sufficient. Specifically, in arrangements having about equal angles ϕ and θ, and a group delay time $\tau \approx 2\pi/\Delta\omega_o$. $\Delta\omega_o$ is the spectral linewidth of the laser beam provided by seed laser 12. In these arrangements, a minimum power transmitted through optical apparatus 10 corresponds to phase delay $\omega_c\tau+\varphi=\pi$ rad. Dithering and adjusting phase φ to minimize the power of the separated fraction would find and maintain a desired phase delay $\omega_c\tau+\varphi=\pi$ rad. This method, including a power measurement in analyzer 46, would work in the examples of spectral shaping illustrated in FIGS. 8 and 9. In particular, the method would work to maintain the optimized transmission spectra through optical apparatus 10 to maximize the SBS threshold for amplification in amplifier 42.

The present invention is described above in terms of a preferred embodiment and other embodiments. The invention is not limited, however, to the embodiments described and depicted herein. Rather, the invention is limited only by the claims appended hereto.

What is claimed is:

1. An optical apparatus for spectrally shaping a laser beam, comprising:
   a birefringent optic having orthogonal first and second polarization axes, the birefringent optic arranged to receive and transmit the laser beam, the laser beam received by the birefringent optic being linearly polarized and having an electric-field vector oriented at an oblique angle ϕ to the first polarization axis; and
   a linear polarizer having a polarizing direction, the polarizer arranged to receive the laser beam transmitted through the birefringent optic and to transmit a portion thereof, the polarizing direction oriented at an oblique angle θ to the first polarization axis, the portion of the laser beam transmitted through the polarizer having a more-uniform power spectral density than the laser beam received by the birefringent optic;
   wherein transmission through the birefringent optic induces a wavelength-dependent phase shift between a component of the laser beam parallel to the first polarization axis and a component of the laser beam parallel to the second polarization axis, the wavelength-dependent phase shift producing a wavelength-dependent polarization state of the laser beam transmitted through the birefringent optic, thereby modulating power spectral density in the portion of the laser beam transmitted through the polarizer;
   wherein angles ϕ and θ are in a range between 19° and 30°; and
   wherein the birefringent optic causes a phase delay between the component of the laser beam parallel to the first polarization axis and the component of the laser beam parallel to the second polarization axis, and the phase delay is in a range between $7\pi/8$ and $9\pi/8$ radians.

2. The optical apparatus of claim 1, wherein angle $\phi$ differs from angle $\theta$ by less than 5°.

3. The optical apparatus of claim 1, wherein the birefringent optic includes a phase modulator for contributing polarization mode dispersion thereto.

4. The optical apparatus of claim 3, further including a source of electric potential for driving the phase modulator, the phase modulator causing the phase delay $\omega_c\tau+\varphi$ between the component of the laser beam parallel to the first polarization axis and the component of the laser beam parallel to the second polarization axis, where $\omega_c\tau$ is a fixed phase and $\varphi$ is a varying phase.

5. The optical apparatus of claim 4, wherein angle $\phi$ differs from angle $\theta$ by less than 5°, and the phase delay $\omega_c\tau+\varphi$ is in a range between $15\pi/16$ and $17\pi/16$ radians.

6. The optical apparatus of claim 5, wherein angles $\phi$ and $\theta$ are between 22° and 27°.

7. The optical apparatus of claim 1, wherein the birefringent optic includes a polarization-maintaining optical fiber for contributing polarization mode dispersion thereto.

8. The optical apparatus of claim 1, wherein the laser beam is provided by a seed laser, the laser beam delivered from the seed laser through a splice to the birefringent optic, angle $\phi$ being a splice angle of the splice.

9. The optical apparatus of claim 1, wherein the birefringent optic and the polarizer are joined by a splice, angle $\theta$ being a splice angle of the splice.

10. A master-oscillator power-amplifier (MOPA) laser, comprising:
   a seed laser for providing a linearly-polarized laser beam;
   a birefringent optic for receiving and transmitting the laser beam, the birefringent optic having orthogonal first and second polarization axes, the laser beam received by the birefringent optic having an electric-field vector oriented at an oblique angle $\phi$ to the first polarization axis;
   a linear polarizer having a polarizing direction, the polarizer arranged to receive the laser beam transmitted through the birefringent optic and to transmit a portion thereof, the polarizing direction oriented at an oblique angle $\theta$ to the first polarization axis, the portion of the laser beam transmitted through the polarizer having a more-uniform power spectral density than the laser beam provided by the seed laser; and
   an amplifier for receiving the portion of the laser beam transmitted through the polarizer and generating an amplified laser beam, the amplified laser beam having more power than the laser beam provided by the seed laser;
   wherein transmission through the birefringent optic induces a wavelength-dependent phase shift between a component of the laser beam parallel to the first polarization axis and a component of the laser beam parallel to the second polarization axis, the wavelength-dependent phase shift producing a wavelength-dependent polarization state of the laser beam transmitted through the birefringent optic, thereby modulating power spectral density in the portion of the laser beam transmitted through the polarizer;
   wherein angles $\phi$ and $\theta$ are in a range between 19° and 30°; and
   wherein the birefringent optic causes a phase delay between the component of the laser beam parallel to the first polarization axis and the component of the laser beam parallel to the second polarization axis, and the phase delay is in a range between $7\pi/8$ and $9\pi/8$ radians.

11. The MOPA laser of claim 10, wherein the birefringent optic includes a phase modulator for contributing polarization mode dispersion thereto, the phase modulator driven by an electric potential from a source thereof.

12. The MOPA laser of claim 11, further including a splitter for separating a fraction of the laser beam transmitted through the polarizer and an analyzer for measuring a deviation of an actual phase delay of the separated fraction of the laser beam from a desired phase delay of the laser beam transmitted through the polarizer, the analyzer arranged to send an error signal or a control signal to the source of electric potential, thereby adjusting the electric potential and minimizing the deviation.

13. The MOPA laser of claim 10, wherein the birefringent optic includes a polarization-maintaining optical fiber for contributing polarization mode dispersion thereto.

14. The MOPA laser of claim 10, wherein angle $\phi$ differs from angle $\theta$ by less than 5°.

15. The MOPA laser of claim 14, wherein the phase delay being in a range between $15\pi/16$ and $17\pi/16$ radians.

16. The MOPA laser of claim 10, wherein the seed laser and the birefringent optic are joined by a splice, angle $\phi$ being a splice angle of the splice.

17. A method for spectrally shaping a laser beam, comprising the steps of:
   delivering a linearly-polarized laser beam to a birefringent optic, the linearly-polarized laser beam having an electric-field vector, the birefringent optic having orthogonal first and second polarization axes;
   dividing the linearly-polarized laser beam received by the birefringent optic into a component parallel to the first polarization axis and another component parallel to the second polarization axis by orienting the electric-field vector between the first and second polarization axes;
   transmitting the laser beam through the birefringent optic to induce a wavelength-dependent phase shift between the components parallel to the first and second polarization axes, the wavelength-dependent phase shift producing a wavelength-dependent polarization state of the laser beam transmitted through the birefringent optic;
   inducing a phase delay between the component of the laser beam parallel to the first polarization axis and the component of the laser beam parallel to the second polarization axis during transmission of the laser beam through the birefringent optic;
   delivering the laser beam transmitted through the birefringent optic to a linear polarizer, the polarizer having a polarizing direction oriented between the first and second polarization axes; and
   transmitting a portion of the laser beam received by the polarizer therethrough, the transmitted portion having a modulated power spectral density that is more uniform than the laser beam received by the birefringent optic;
   wherein the electric-field vector is oriented at an oblique angle $\phi$ to the first polarization axis, the polarizing direction is oriented at an oblique angle $\theta$ to the first polarization axis, angles $\phi$ and $\theta$ are in a range between 19° and 30°; and
   wherein the phase delay is in a range between $7\pi/8$ and $9\pi/8$ radians.

18. The method of claim 17, wherein angle $\phi$ differs from angle $\theta$ by less than 5°, and the phase delay is in a range between $15\pi/16$ and $17\pi/16$ radians.

19. The method of claim 17, further comprising the steps of separating a fraction of the laser beam transmitted through the polarizer, analyzing the separated fraction to measure any deviation of an actual phase delay from a desired phase delay, and adjusting the phase delay to maintain the desired phase delay.

* * * * *